US012540205B2

(12) United States Patent
Finette et al.

(10) Patent No.: US 12,540,205 B2
(45) Date of Patent: Feb. 3, 2026

(54) COOLING OF REACTION MIXTURE OBTAINED BY HIGH-PRESSURE POLYMERIZATION PROCESS OF ETHYLENICALLY UNSATURATED MONOMERS

(71) Applicant: Basell Polyolefine GmbH, Wesseling (DE)

(72) Inventors: Andre-Armand Finette, Cologne (DE); Juergen Mohrbutter, Alfter (DE); Christoph Wolf, Pulheim-Dansweiler (DE); Michael Deuerling, Weilerswist (DE); Danir Khayrullin, Bruehl (DE); Dieter Littmann, Mücke (DE)

(73) Assignee: Basell Polyolefine GmbH, Wesseling (DE)

( * ) Notice: Subject to any disclaimer, the term of this patent is extended or adjusted under 35 U.S.C. 154(b) by 812 days.

(21) Appl. No.: 17/780,318

(22) PCT Filed: Dec. 1, 2020

(86) PCT No.: PCT/EP2020/084052
§ 371 (c)(1),
(2) Date: May 26, 2022

(87) PCT Pub. No.: WO2021/110645
PCT Pub. Date: Jun. 10, 2021

(65) Prior Publication Data
US 2023/0014128 A1    Jan. 19, 2023

(30) Foreign Application Priority Data

Dec. 3, 2019   (EP) ..................................... 19213346

(51) Int. Cl.
*C08F 110/02* (2006.01)
*C08F 2/01* (2006.01)
(Continued)

(52) U.S. Cl.
CPC .............. *C08F 110/02* (2013.01); *C08F 2/01* (2013.01); *C08F 2/38* (2013.01); *C08L 23/06* (2013.01); *C08L 2207/066* (2013.01)

(58) Field of Classification Search
CPC .................................. C08F 110/02; C08F 2/01
See application file for complete search history.

(56) References Cited

U.S. PATENT DOCUMENTS

| 2,856,395 A | 10/1958 | Richard, Jr. et al. |
| 10,472,428 B2 | 11/2019 | Gonioukh et al. |

(Continued)

FOREIGN PATENT DOCUMENTS

| CN | 1440427 A | 9/2003 |
| CN | 104903364 A | 9/2015 |

(Continued)

OTHER PUBLICATIONS

The International Search Report and The Written Opinion for PCT/EP2020/084052 mailed Jan. 27, 2021.

*Primary Examiner* — Mark S Kaucher (57) ABSTRACT

A process for preparing ethylene polymers including the step of polymerizing ethylene or copolymerizing ethylene and one or more comonomers at a temperature from 100° C. to 350° C. and a pressure of from 110 MPa to 350 MPa in a continuously operated tubular polymerization reactor, thereby yielding a reaction mixture, wherein the tubular polymerization reactor has a reactor cooling jacket for removing the heat of the reaction and a pressure control valve, the reaction mixture leaves the reactor through the pressure control valve, the reaction mixture then passes a post-reactor cooler equipped with a post-reactor cooling jacket, the reactor cooling jacket is provided with a reactor coolant having an inlet temperature and the post-reactor cooling jacket is provided with a post-reactor coolant having an inlet temperature, and the inlet temperature of the post- (Continued)

reactor coolant is independently controlled from the inlet temperature of the reactant coolant.

13 Claims, 3 Drawing Sheets

(51) Int. Cl.
    *C08F 2/38*          (2006.01)
    *C08L 23/06*        (2006.01)

(56)               References Cited

U.S. PATENT DOCUMENTS

| | | | |
|---|---|---|---|
| 10,562,986 | B2 | 2/2020 | Gonioukh et al. |
| 2010/0261855 | A1* | 10/2010 | Barbero ................ B01J 19/242 |
| | | | 422/131 |
| 2011/0301307 | A1* | 12/2011 | Littmann .................. B01J 4/02 |
| | | | 422/135 |
| 2013/0274424 | A1 | 10/2013 | Weiand et al. |
| 2015/0274856 | A1* | 10/2015 | Berbee ............. C09D 123/0869 |
| | | | 521/143 |
| 2017/0204206 | A1* | 7/2017 | Penzo ........................ C08F 2/01 |
| 2018/0030160 | A1 | 2/2018 | Wolfram et al. |

FOREIGN PATENT DOCUMENTS

| | | |
|---|---|---|
| CN | 107949582 A | 4/2018 |
| GB | 1578954 A | 11/1980 |
| RU | 2447088 C2 | 4/2012 |
| SU | 301925 A3 | 4/1971 |
| WO | 0185807 A1 | 11/2001 |
| WO | 2007018871 A1 | 2/2007 |
| WO | 2015197561 A1 | 12/2015 |
| WO | 2019134886 A1 | 7/2019 |

\* cited by examiner

COOLING OF REACTION MIXTURE OBTAINED BY HIGH-PRESSURE POLYMERIZATION PROCESS OF ETHYLENICALLY UNSATURATED MONOMERS

This application is the U.S. National Phase of PCT International Application PCT/EP2020/084052, filed Dec. 1, 2020, claiming benefit of priority to European Patent Application No. 19213346.0, filed Dec. 3, 2019, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure provides a process for preparing ethylene polymers including the step of polymerizing ethylene or copolymerizing ethylene and one or more comonomers in a continuously operated tubular polymerization reactor.

BACKGROUND OF THE INVENTION

In some instances, ethylene polymers are formed in high-pressure polymerization processes. These processes include the steps of compressing the reaction mixture to the reactor pressure, introducing an initiator, polymerizing the ethylene polymers while removing exothermic heat of reaction, separating the reaction products, and optionally further processing. In some instances, the reactors for forming low density ethylene-based polymers are tubular reactors.

In some instances, a plant for preparing low density polyethylene includes the polymerization reactor and other equipment. In some instances, the polymerization unit includes components for feeding monomers and comonomers, free-radical initiators, chain transfer agents or other substances at one or more positions to the polymerization reaction. In some instances, a combination of two compressors (that is, a primary compressor and a secondary compressor) is used to pressurize the reaction components to the reactor pressure. At the end of the polymerization sequence, a high-pressure polymerization unit may include apparatuses like extruders and granulators for pelletizing the resulting polymer.

In some instances, the radically-initiated polymerization of ethylenically unsaturated monomers under high pressure does not completely convert the monomers to ethylene polymers. In some instances, the process permits the resulting reaction mixture to leave the reactor through a pressure control valve, separates the reaction mixture into polymeric and gaseous components, and recycles the unreacted monomers. In some instances, and to minimize decompression and compression steps in the recycling of the unreacted monomers, the polymeric and gaseous components are separated in two stages. During the first stage, the monomer-polymer mixture leaving the reactor is transferred to a first separating vessel, wherein the monomer-polymer mixture is separated into polymeric and gaseous components at a pressure that allows recycling of the ethylene and comonomers separated from the monomer-polymer mixture to the reaction mixture at a position between the primary compressor and the secondary compressor. At the first separation vessel operating conditions, the polymeric components within the separating vessel are in liquid state. During the second stage, the liquid phase obtained in the first separating vessel is transferred to a second separation vessel, wherein the polymeric and gaseous components are separated at lower pressure. The ethylene and comonomers separated from the mixture in the second separation vessel are fed to the primary compressor, wherein the ethylene and comonomers are compressed to the pressure of the fresh ethylene feed and combined with the fresh ethylene feed. The joined streams are further pressurized to the pressure of the high-pressure gas recycle stream.

The properties and the structure of the produced ethylene polymers, such as molecular weight, molecular weight distribution and the amount of short- and long-chain branching, depend on the reaction parameters. One of those reaction parameters is reactor temperature. Notably, ethylene conversion in a reaction zone depends on the amount of polymerization heat. That is, at a given start temperature, the ethylene conversion increases as the peak polymerization temperature increases. Consequently and in some instances, high-pressure polymerizations of ethylenically unsaturated monomers are operated at high temperatures. Additionally, tubular reactor is equipped with cooling jackets to remove the heat of polymerization and return the reactor to the start temperature. In many instances, these cooling jackets use hot water as the coolant. In some instances, as the hot water absorbs heat, the hot water is converted to steam by the released heat of polymerization. The steam is used in other parts of the process.

SUMMARY OF THE INVENTION

In a general embodiment, the present disclosure provides a process for preparing ethylene polymers including the step of polymerizing ethylene or copolymerizing ethylene and one or more comonomers at a temperature from 100° C. to 350° C. and a pressure of from 110 MPa to 350 MPa in a continuously operated tubular polymerization reactor, thereby yielding a reaction mixture,
  wherein the tubular polymerization reactor has a reactor cooling jacket for removing the heat of the reaction and a pressure control valve,
  wherein the reaction mixture leaves the reactor through the pressure control valve,
  wherein the reaction mixture then passes a post-reactor cooler equipped with a post-reactor cooling jacket,
  wherein the reactor cooling jacket is provided with a reactor coolant having an inlet temperature and the post-reactor cooling jacket is provided with a post-reactor coolant having an inlet temperature, and
  wherein the inlet temperature of the post-reactor coolant is independently controlled from the inlet temperature of the reactor coolant.

In some embodiments, the post-reactor cooler is equipped with an upstream cooling jacket and a downstream cooling jacket, wherein the upstream cooling jacket is provided with an upstream coolant, the downstream cooling jacket is provided with a downstream coolant, and the inlet temperature of the upstream coolant is independently controlled from the inlet temperature of the downstream coolant.

In some embodiments, the coolant fed to the upstream cooling jacket of the post-reactor cooler, of which the inlet temperature is independently controlled from the inlet temperature of the coolant or the coolants fed to the one or more reactor cooling jackets cooling the polymerization reactor, is the coolant fed to a downstream cooling jacket.

In some embodiments, the tubular polymerization reactor has a reaction zone, having an upstream segment equipped with an upstream-cooling jacket and a downstream segment equipped with a downstream-cooling jacket, wherein a polymerization of ethylene or a copolymerization of ethylene and the one or more comonomers occurs in the upstream segment, the reaction mixture is cooled in the downstream segment, and wherein the inlet temperature of a coolant fed to the downstream cooling jacket is independently controlled from the inlet temperature of coolant fed to the upstream-cooling jacket.

In some embodiments, the coolant inlet temperatures of the coolants cooling the reactor cooling jackets of the tubular polymerization reactor and the post-reactor cooling jackets of the post reactor cooler are in the range from 50° C. to 220° C.

In some embodiments, the coolant inlet temperature of the coolant of the post-reactor cooling jackets, of which the inlet temperature is independently controlled from the inlet temperature of the coolant or the coolants fed to the one or more cooling jackets cooling the polymerization reactor, is in the range from 80° C. to 220° C.

In some embodiments, the inlet temperature of at least one coolant fed to the one or more reactor cooling jackets cooling the polymerization reactor is controlled in a manner to achieve a maximum ethylene conversion.

In some embodiments, the inlet temperature of the coolant of the post-reactor cooling jackets, of which the inlet temperature is independently controlled from the inlet temperature of the coolant or the coolants fed to the one or more reactor cooling jackets cooling the polymerization reactor, is controlled by providing the temperature of the melt fed to the extruder or granulator device as set point.

In some embodiments, the coolants for cooling the reactor cooling jackets of the polymerization reactor and cooling the post-reactor cooling jackets of the post-reactor cooler are operated in closed loops.

In some embodiments, the coolants for cooling the reactor cooling jackets of the tubular polymerization reactor and for cooling the post-reactor cooling jackets of the post-reactor cooler are circulated in a cooling system having a volume buffer system for accommodating volume expansion of the coolant, a coolant circulation pump, and a cooling arrangement for removing the absorbed heat of polymerization from the cooling system.

In some embodiments, the coolants for cooling the reactor cooling jackets of the polymerization reactor and cooling the post-reactor cooling jackets of the post-reactor cooler are pressurized water streams.

In some embodiments, the pressurized water streams for cooling the cooling jackets of the tubular polymerization reactor are circulated in cooling systems having a buffer vessel and a water circulation pump, and the inlet temperatures of the pressurized water streams are controlled by varying the pressures in the buffer vessels.

In some embodiments, the pressurized water streams are circulated in a secondary cooling system which is cooled by a primary cooling system.

In some embodiments, the temperature of the melt fed to the extruder or granulator device is from 220° C. to 270° C.

In some embodiments, the ethylene polymers are low density polyethylenes, having a melt flow rate MFR determined according to DIN EN ISO 1133:2005, condition D at a temperature of 190° C. under a load of 2.16 kg of from 0.05 g/10 min to 500 g/10 min.

DETAILED DESCRIPTION OF THE INVENTION

In some embodiments, the present disclosure provides a process for preparing ethylene polymers including the step of polymerizing ethylene or copolymerizing ethylene and one or more comonomers at a temperature from 100° C. to 350° C. and a pressure of from 110 MPa to 350 MPa in a continuously operated tubular reactor, thereby yielding a reaction mixture. In some embodiments, the reaction mixture leaves the reactor through a pressure control valve and then passes a post reactor cooler equipped with a post-reactor cooling jacket.

In some embodiments, the process for preparing ethylene polymers is a homopolymerization of ethylene or a copolymerization of ethylene with one or more other monomers, provided that these monomers are free-radically copolymerizable with ethylene under high pressure. In some embodiments, the copolymerizable monomers are selected from the group consisting of $\alpha,\beta$-unsaturated $C_3$-$C_8$-carboxylic acids, derivatives of $\alpha,\beta$-unsaturated $C_3$-$C_8$-carboxylic acids, 1-olefins, and vinyl carboxylates. In some embodiments, the $\alpha,\beta$-unsaturated $C_3$-$C_8$-carboxylic acids are selected from the group consisting of maleic acid, fumaric acid, itaconic acid, acrylic acid, methacrylic acid. and crotonic acid. In some embodiments, the derivatives of $\alpha,\beta$-unsaturated $C_3$-$C_8$-carboxylic acids are selected from the group consisting of unsaturated $C_3$-$C_{15}$-carboxylic esters or anhydrides. In some embodiments, the derivatives of $\alpha,\beta$-unsaturated $C_3$-$C_8$-carboxylic acids are esters of $C_1$-$C_6$-alkanols. In some embodiments, the derivatives of $\alpha,\beta$-unsaturated $C_3$-$C_8$-carboxylic acids are selected from the group consisting of methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride, and itaconic anhydride. In some embodiments, the 1-olefins are selected from the group consisting of propene, 1-butene, 1-pentene, 1-hexene, 1-octene, and 1-decene. In some embodiments, the vinyl carboxylates are selected from the group consisting of vinyl acetate and vinyl propionate. In some embodiments, the comonomer is selected from the group consisting of propene, 1-butene, 1-hexene, acrylic acid, n-butyl acrylate, tert-butyl acrylate, 2-ethylhexyl acrylate, vinyl acetate, and vinyl propionate.

In some embodiments, the proportion of comonomer or comonomers in the reaction mixture is from 1 to 50% by weight, alternatively from 3 to 40% by weight, based on the quantity of monomers, that is, the sum of ethylene and other monomers. In some embodiments, the comonomers are fed at more than a single point to the reactor set-up. In some embodiments, the comonomers are fed to the suction side of the secondary compressor.

As used herein, the terms "polymers" or "polymeric materials" refers to substances made from or containing at least two monomer units. In some embodiments, the polymers or polymeric materials are low density polyethylenes having an average molecular weight $M_n$ of more than 20000 g/mole. As used herein, the term "low density polyethylene" includes ethylene homopolymers and ethylene copolymers. In some embodiments, the process of the present disclosure prepares oligomers, waxes, and polymers having a molecular weight $M_n$ of less than 20000 g/mole.

In some embodiments, the process of the present disclosure is a radical polymerization carried out in the presence of free-radical polymerization initiators. In some embodiments, initiators for starting the polymerization in the respective reaction zones are substance that produce radical species under the conditions in the polymerization reactor. In some embodiments, the initiators are selected from the group consisting of oxygen, air, azo compounds, and peroxidic polymerization initiators. In some embodiments, the polymerization is carried out by using oxygen, fed in the form of pure oxygen or as air. In some embodiments, the polymerization is initiated with oxygen, and the initiator is first mixed with the ethylene feed and then fed to the reactor. In some embodiments, a stream made from or containing monomer and oxygen is fed to the beginning of the polymerization reactor. In some embodiments, the stream is fed to one or more points along the reactor, thereby creating two or more reaction zones. In some embodiments, the initiator is selected from the group consisting of organic peroxides and azo compounds. In some embodiments, the organic peroxides are selected from the group consisting of peroxy esters, peroxy ketals, peroxy ketones, and peroxycarbonates, In some embodiments, the organic peroxides are selected from the group consisting of di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide, tert-butyl hydroperoxide, didecanoyl peroxide, 2,5-dimethyl-2,5-di(2-ethylhexanoylperoxy) hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert-butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxybenzoate, methyl isobutyl ketone hydroperoxide, 3,6,9-triethyl-3,6,9-trimethyl-triperoxocyclononane, and 2,2-di(tert-butylperoxy)butane. In some embodiments, the peroxycarbonates are selected from the group consisting of di(2-ethylhexyl) peroxydicarbonate, dicyclohexyl peroxydicarbonate, diacetyl peroxydicarbonate, tert-butyl peroxyisopropylcarbonate, and di-sec-butyl peroxydicarbonate. In some embodiments, the free-radical polymerization initiators are selected from the group consisting of azoalkanes (diazenes), azodicarboxylic esters, azodi-carboxylic dinitriles, and hydrocarbons which decompose into free radicals. In some embodiments, the azodicarboxylic dinitriles is azobisisobutyronitrile. In some embodiments, the hydrocarbons which decompose into free radicals (that is, C-C initiators) are selected from the group consisting of 1,2-diphenyl-1,2-dimethylethane derivatives and 1,1,2,2-tetramethylethane derivatives. In some embodiments, individual initiators or mixtures of various initiators are used. In some embodiments, initiators are commercially available from Akzo Nobel under the trade names Trigonox® or Perkadox®.

In some embodiments, the peroxidic polymerization initiators are selected from the group consisting of 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne. In some embodiments, the peroxidic polymerization initiators are selected from the group consisting of tert-butyl peroxy-3,5,5-trimethylhexanoate, di-(2-ethylhexyl)peroxydicarbonate, and tert-butyl peroxy-2-ethylhexanoate.

In some embodiments, the initiators are employed individually or in a mixture in concentrations of from 0.1 mol/t to 50 mol/t of polyethylene produced, alternatively from 0.2 mol/t to 20 mol/t, in each reaction zone. In some embodiments, the free-radical polymerization initiator is a mixture of at least two different azo compounds or organic peroxides. In some embodiments, the initiator mixtures are fed to the reaction zones. In some embodiments, the mixtures are made from or containing two to six initiators, alternatively two initiators, alternatively three initiators, alternatively four different initiators. In some embodiments, the mixtures are made from or containing initiators having different decomposition temperatures.

In some embodiments, the initiators are used in a dissolved state. In some embodiments, the solvents are selected from the group consisting of ketones and aliphatic hydrocarbons. In some embodiments, the aliphatic hydrocarbons are selected from the group consisting of octane, decane, isododecane, and other saturated $C_8$-$C_{25}$-hydrocarbons. In some embodiments, the solutions are made from or containing the initiators or initiator mixtures in proportions of from 2 to 65% by weight, alternatively from 5 to 40% by weight, alternatively from 8 to 30% by weight.

In some embodiments, the polymerization is carried out in the presence of a chain transfer agent. It is believed and as used herein, chain transfer agents are chemical compounds which interact with a growing polymer chain, terminate the further growth of the growing polymer chain, and induce the growth of another growing chain. In some embodiments, the molecular weight of the polymers is altered by addition of chain transfer agents. In some embodiments and as used herein, chain transfer agents are alternatively termed modifiers or regulators. In some embodiments, chain transfer agents are selected from the group consisting of hydrogen, aliphatic and olefinic hydrocarbons, ketones, aldehydes, saturated aliphatic alcohols, and mixtures of these compounds. In some embodiments, the hydrocarbons are selected from the group consisting of propane, butane, pentane, hexane, cyclohexane, propene, 1-butene, 1-pentene, and 1-hexene. In some embodiments, the ketones are selected from the group consisting of acetone, methyl ethyl ketone (2-butanone), methyl isobutyl ketone, methyl isoamyl ketone, diethyl ketone, and diamyl ketone. In some embodiments, the aldehydes are selected from the group consisting of formaldehyde, acetaldehyde, and propionaldehyde. In some embodiments, the saturated aliphatic alcohols are selected from the group consisting of methanol, ethanol, propanol, isopropanol, and butanol. In some embodiments, chain transfer agents are saturated aliphatic aldehydes, olefinic hydrocarbons, aliphatic hydrocarbons, or mixtures of these compounds. In some embodiments, the saturated aliphatic aldehyde is propionaldehyde. In some embodiments, the olefinic hydrocarbons is propene, 1-butene, or 1-hexene. In some embodiments, the aliphatic hydrocarbons are propane. In some embodiments, the amount of chain transfer agent fed to the tubular reactor is from 0.2 kg/t prepared polymer to 40 kg/t prepared polymer, alternatively 0.4 kg/t prepared polymer to 20 kg/t prepared polymer. In some embodiments, a chain transfer agent made from or containing at least one aldehyde or at least one ketone is employed and the amount of added aldehydes and ketones is from 0.4 kg/t of prepared polymer to 10 kg/t of prepared polymer.

In some embodiments, the transfer agent is propionic aldehyde. In some embodiments, the chain transfer agent is a mixture of propionic aldehyde and one or more olefinic hydrocarbons.

In some embodiments, the high-pressure polymerization is carried out at pressures in the range from 110 MPa to 350 MPa, alternatively from 180 MPa to 350 MPa, alternatively from 200 MPa to 320 MPa. In some embodiments, the polymerization temperatures are in the range from 100° C. to 350° C., alternatively from 120° C. to 340° C., alternatively from 150° C. to 330° C., alternatively 180° C. to 350° C.

In some embodiments, the compression of the reaction gas composition to the polymerization pressure is carried out by a combination of a primary compressor and a secondary compressor, wherein the primary compressor first compresses the reaction gas composition to a pressure of from 10 MPa to 50 MPa and the secondary compressor then further compresses the reaction gas composition to the polymerization pressure of from 110 MPa to 350 MPa, alternatively from 180 MPa to 350 MPa. In some embodiments, the primary compressor and the secondary compressor are multistage compressors. In some embodiments, one or more stages of one or both compressors are separated. In some embodiments, the stages are divided into separated compressors. In some embodiments, a series of a primary compressor and a secondary compressor is used for compressing the reaction gas composition to the polymerization pressure. In some embodiments, the whole primary compressor is designated as "primary compressor." In some embodiments, the one or more first stages of the primary compressor, which compress the recycle gas from the low-pressure product separator to the pressure of the fresh ethylene feed, is designated as the "booster" compressor and then the one or more subsequent stages are designated as the "primary" compressor even though the booster compressor and the subsequent stages are part of the same apparatus. In some embodiments, the secondary compressor is designated the "hyper" compressor. As used herein, the term "capacity of a compressor" refers to the feed rate of compressed reaction gas composition from the compressor combination to the tubular reactor. In some embodiments, the capacity of the secondary compressor is from 80 t/h to 210 t/h, alternatively from 100 t/h to 180 t/h, alternatively from 120 t/h to 160 t/h.

In some embodiments, the reaction gas composition provided by the secondary compressor is fed to the inlet of the tubular reactor. In some embodiments, a part of the reaction gas composition compressed by the secondary compressor is fed to the inlet of the tubular reactor and the remainder of the reaction gas composition compressed by the secondary compressor is fed as one or more side streams to the tubular reactor downstream of the inlet of the tubular reactor. In some embodiments, from 30 to 90% by weight, alternatively from 40 to 70% by weight, of the reaction gas composition provided by the secondary compressor is fed to the inlet of the tubular reactor and from 10 to 70% by weight, alternatively from 30 to 60% by weight, of the reaction gas composition provided by the secondary compressor is fed as one or more side streams to the tubular reactor downstream of the inlet of the tubular reactor.

In some embodiments, the reaction mixture leaves the reactor through a pressure control valve for controlling the pressure within the polymerization reactor. In some embodiments, the pressure control valve is arranged downstream of the outlet of the polymerization reactor. In some embodiments, the pressure control valve reduces the pressure of the reaction mixture leaving the reactor to the pressure within the first separation vessel. Downstream of the pressure control valve the reaction mixture passes a post reactor cooler equipped with one or more post-reactor cooling jackets.

In some embodiments, the tubular reactor is part of a polymerization system having the polymerization reactor and two or more gas recycle lines for recycling unreacted monomers into the polymerization process. In some embodiments, the reaction mixture obtained in the polymerization reactor is transferred to a first separation vessel and separated into a gaseous fraction and a liquid fraction at an absolute pressure of from 15 MPa to 50 MPa. In some embodiments, the first separation vessel is referred to as a "high-pressure product separator". The gaseous fraction withdrawn from the first separation vessel is fed via a high-pressure gas recycle line to the suction side of the secondary compressor. In some embodiments and in the high-pressure gas recycle line, the gas is purified by several purification steps. In some embodiments, the removed components are entrained polymer or oligomers. The liquid fraction withdrawn from the first separation vessel is transferred to a second separation vessel and further separated, at reduced pressure, alternatively at an absolute pressure in the range of from 0.1 to 0.5 MPa, in polymeric and gaseous components. In some embodiments, the liquid fraction withdrawn from the first separation vessel is made from or containing dissolved monomers in an amount of 20 to 40% of weight. In some embodiments, the monomers are ethylene and comonomers. In some embodiments, the second separation vessel is referred to as a "low-pressure product separator." In some embodiments, the gaseous fraction withdrawn from the second separation vessel is fed via a low-pressure gas recycle line to the primary compressor, alternatively to the foremost of the stages. In some embodiments, the low-pressure gas recycle line provides several purification steps for purifying the gas. In some embodiments, the production line further includes additional separation steps for separating additional gaseous fractions from the reaction mixtures and additional gas recycle lines for feeding such additional gaseous fractions made from or containing unreacted monomers to a compressor. In some embodiments, the additional steps are between the first separation step and the second separation step, operating at an intermediate pressure.

In some embodiments, the polymeric components are transformed into pellets, by apparatuses like extruders or granulators.

The process of the present disclosure is carried out in a continuously operated tubular polymerization reactor, having a reactor cooling jacket for removing the heat of the reaction. In some embodiments, the tubular reactors are long, thick-walled pipes, alternatively from about 0.5 km to 5 km, alternatively from 1 km to 4 km, alternatively from 1.5 km to 3 km long. In some embodiments, the inner diameter $d_i$ of the tubular reactor is in the range from 50 mm to 120 mm, alternatively from 60 mm to 100 mm. In some embodiments, the tubular reactor is designed to be operated with one or more reaction gas side streams, having a most downstream part of the tubular reactor, which is passed by the total reaction mixture. In some embodiments, the most downstream part has an inner diameter $d_i$ in the range from 50 mm to 120 mm, alternatively from 60 mm to 100 mm. In some embodiments, the tubular reactors have a length-todiameter ratio of greater than 1000, alternatively from 10000 to 50000, alternatively from 20000 to 35000. In some embodiments, the tubular reactor has tubes of a length from 5 m to 25 m, alternatively from 10 m to 22 m, alternatively from 15 m to 20 m. In some embodiments, the individual tubes of the tubular reactor are flanged together. In some embodiments, the tube is flanged to a bend, alternatively to a 180° bend.

In some embodiments, the tubular reactors have at least two reaction zones, alternatively from 2 to 6 reaction zones, alternatively from 2 to 5 reaction zones. The number of reaction zones is given by the number of feeding points for the initiators or initiator mixtures. In some embodiments, a feeding point is an injection point for a solution of azo compounds or organic peroxides. Initiator is added to the reactor, where the initiator decomposes into free radicals and initiates polymerization. It is believed that the generated heat of the reaction raises the temperature of the reaction mixture because more heat is generated than is removed through the walls of the tubular reactor. The rising temperature increases the rate of decomposition of the free-radical initiators and accelerates polymerization until the free-radical initiator is consumed. Thereafter, no further heat is generated, and the temperature decreases because the temperature of the reactor walls is lower than that of the reaction mixture. Accordingly, the part of the tubular reactor downstream of an initiator feeding point, wherein the temperature rises is the "reaction" zone. The part thereafter is a "cooling" zone, wherein the temperature decreases. The amount and nature of added free-radical initiators determines how much the temperature rises and accordingly allows adjusting that value. In some embodiments, the temperature rise is set to be in the range from 70° C. to 170° C. in the first reaction zone and 30° C. to 130° C. for subsequent reaction zones depending on the product specifications and the reactor configuration.

In some embodiments, the post reactor cooler has tubes of a length from 5 m to 25 m, alternatively from 10 m to 22 m, alternatively from 15 m to 20 m. In some embodiments, the individual tubes of the tubular reactor are flanged together. In some embodiments, the tubes are flanged to a bend, alternatively to a 180° bend.

Figure 1:
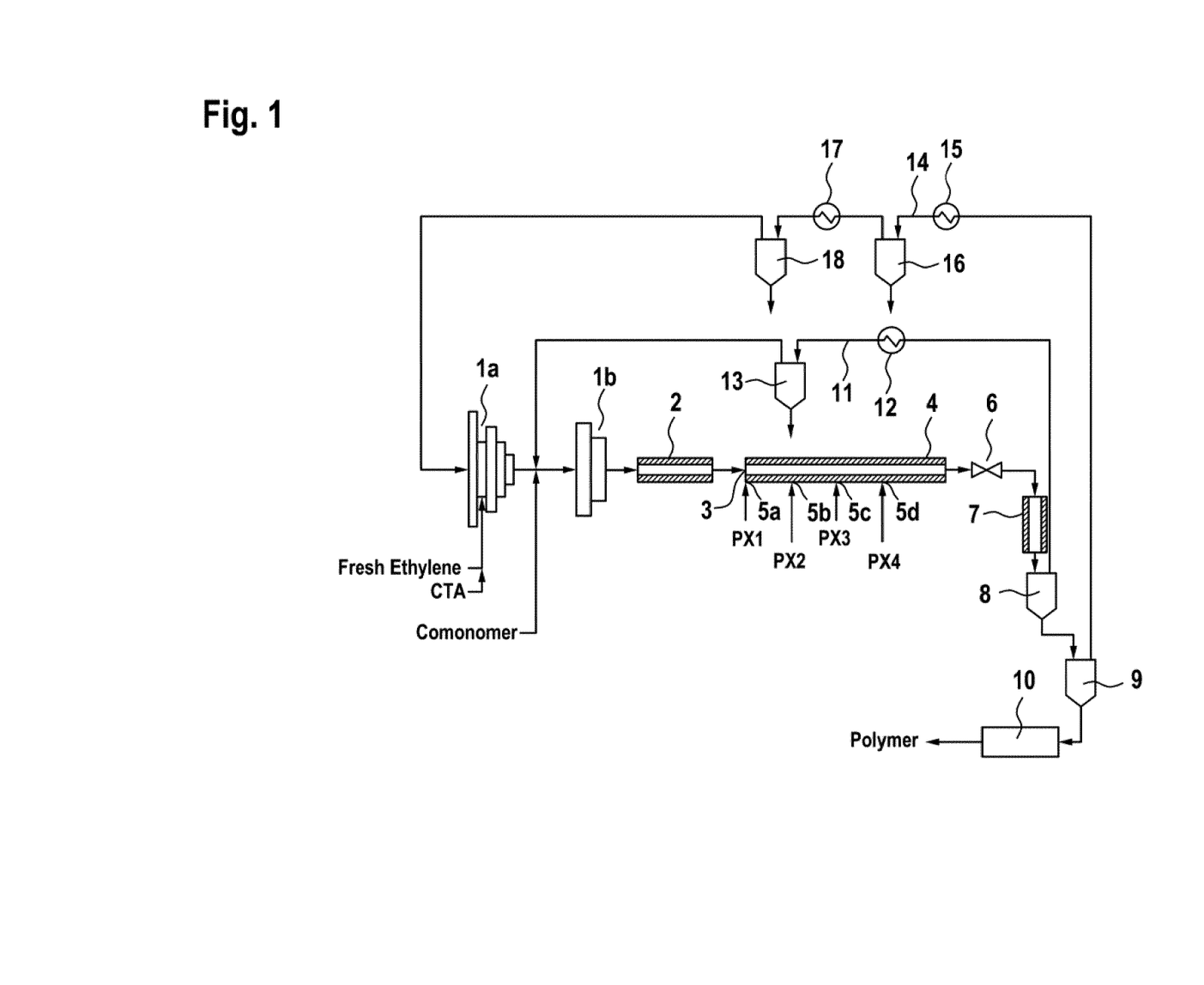
FIG. 1 shows schematically a set-up for preparing ethylene polymers in a continuously operated tubular polymerization reactor.

FIG. 1 shows schematically a set-up for preparing ethylene polymers in a continuously operated tubular polymerization reactor.

In some embodiments, fresh ethylene is firstly compressed to a pressure of about 28 MPa by a primary compressor (1a) and then compressed to the reaction pressure of about 280 MPa using a secondary compressor (1b). The chain transfer agent (CTA) is added to primary compressor (1a). In some embodiments, the fresh ethylene is supplied to the primary compressor under a pressure of 1.7 MPa. The reaction mixture leaving the primary compressor (1b) is fed to pre-heater (2), wherein the reaction mixture is preheated to the reaction start temperature of from about 120° C. to 220° C., and then conveyed to the inlet (3) of the tubular reactor (4).

In some embodiments, the tubular reactor (4) is a long, thick-walled pipe with reactor cooling jackets for removing the liberated heat of reaction from the reaction mixture by a coolant circuit (not shown).

In some embodiments, the tubular reactor (4) has four spatially separated initiator injection points (5a), (5b), (5c) and (5d) for feeding initiators or initiator mixtures PX1, PX2, PX3 and PX4 to the reactor and accordingly also four reaction zones. By feeding free-radical initiators, which decompose at the temperature of the reaction mixture, to the tubular reactor, the polymerization reaction starts.

The reaction mixture leaves the tubular reactor (4) through a pressure control valve (6) and passes a post-reactor cooler (7) with post-reactor cooling jackets for further cooling the reaction mixture. Thereafter, the resulting polymer is separated off from unreacted ethylene and other low molecular weight compounds (monomers, oligomers, polymers, additives, solvent, etc.) by a first separation vessel (8) and a second separation vessel (9), discharged, and pelletized via an extruder and granulator (10).

The ethylene and comonomers which have been separated off in the first separation vessel (8) are fed back to the low-pressure side of the tubular reactor (4) in the high-pressure circuit (11) at 30 MPa. In the high-pressure circuit (11), the gaseous material separated from the reaction mixture is first separated from other constituents in at least one purification stage and then added to the monomer stream between primary compressor (1a) and secondary compressor (1b). FIG. 1 shows one purification stage having a heat exchanger (12) and a separator (13). In some embodiments, a plurality of purification stages is used. In some embodiments, the high-pressure circuit (11) separates solvent and waxes.

The ethylene, which was separated off in the second separation vessel (9) and is further made from or containing the major part of the very low molecular weight products of the polymerization (oligomers) and solvent, is worked up in the low-pressure circuit (14) at an absolute pressure of from about 0.1 to 0.5 MPa in a plurality of separators with a heat exchanger being located between each of the separators. FIG. 1 shows two purification stages having heat exchangers (15) and (17) and separators (16) and (18). In some embodiments, a single purification stage is used. In some embodiments, more than two purification stages are used. In some embodiments, the low-pressure circuit (14) separates oils, solvent, and waxes.

In some embodiments, the tubular polymerization reactors have one or more reactor cooling jackets for removing the heat of the reaction. In some embodiments, the reaction zones of the tubular reactor are equipped with reactor cooling jackets. In some embodiments, each reaction zone of the tubular reactors is equipped with a single reactor cooling jacket, which covers completely or partially the reaction zone. In some embodiments, the tubular reactor has tubes, and each tube has a reactor cooling jacket.

For cooling the reaction mixture leaving the polymerization reactor, the reaction mixture passes a post reactor cooler equipped with one or more post-reactor cooling jackets. In some embodiments, the post reactor cooler has tubes, and each tube has a post-reactor cooling jacket.

In some embodiments, each post-reactor cooling jacket is provided with fresh coolant having a controlled inlet temperature. In some embodiments, some of the post-reactor cooling jackets are provided with fresh coolant and the other post-reactor cooling jackets are provided with coolant, which had previously cooled another post-reactor cooling jacket. In some embodiments, the post-reactor cooling jackets, which are not provided with fresh coolant, are provided with coolant coming from a post-reactor cooling jacket located in the proximity of the respective post-reactor cooling jackets. In some embodiments, the post-reactor cooling jackets, which are not provided with fresh coolant, are provided with coolant coming from the post-reactor cooling jackets located directly downstream of the respective post-reactor cooling jackets.

In some embodiments, the coolant used to cool the reactor cooling jackets of the tubular polymerization reactor and the post-reactor cooling jackets of the post reactor cooler is pressurized water.

Figure 2:
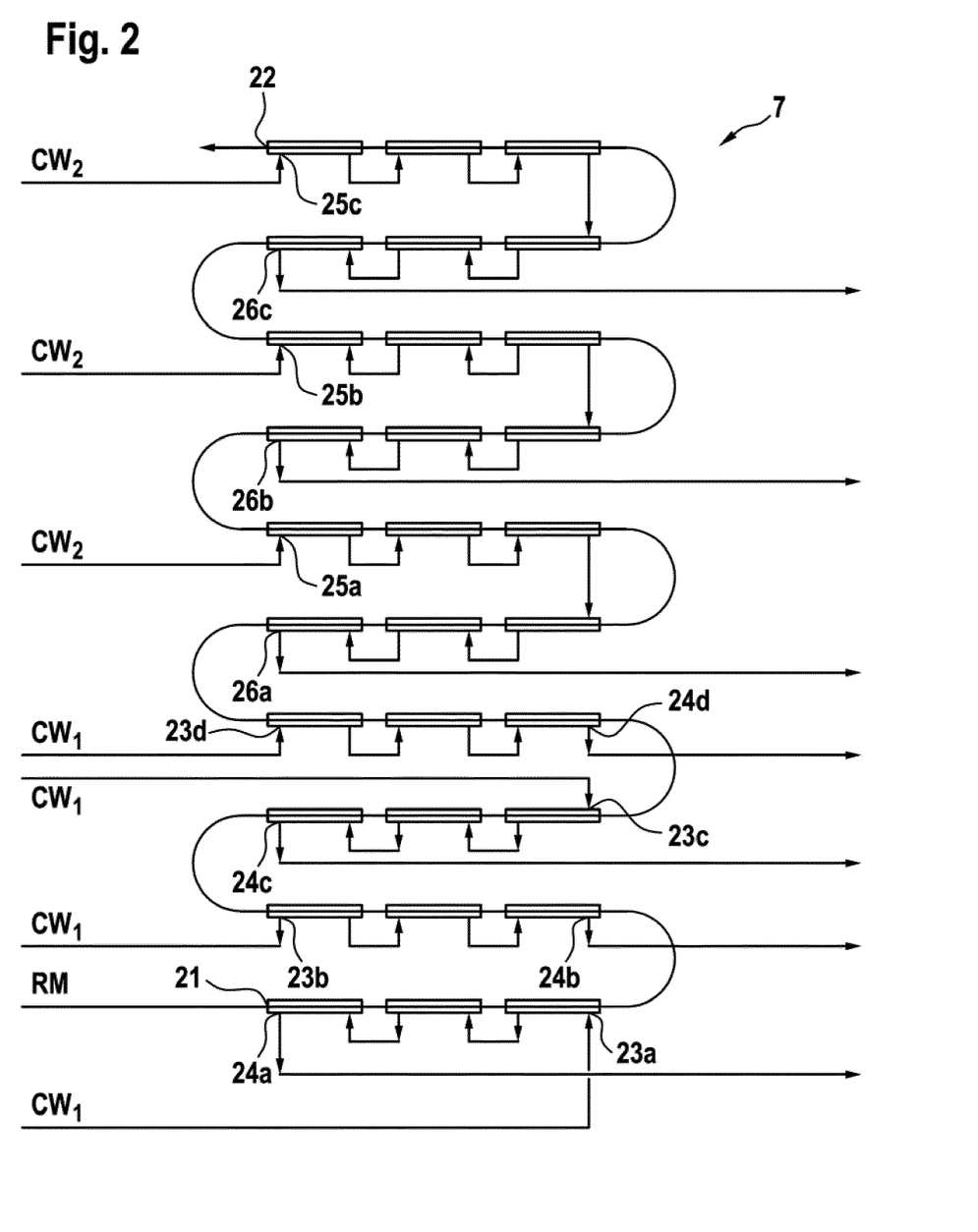
FIG. 2 shows schematically a set-up for the post-reactor cooling jackets of a post-reactor cooler.

FIG. 2 shows schematically a set-up for the cooling jackets of a post reactor cooler (7).

The reaction mixture (RM) coming from the pressure control valve (6) enters the post-reactor cooler (7) at cooler inlet (21) and leaves the post-reactor cooler (7) at post-reactor cooler outlet (22).

In the set-up shown in FIG. 2, the coolant is hot, pressurized water.

Cooling water ($CW_1$) having a temperature $T_{CC1}$ is fed to four triplets of post-reactor cooling jackets at water inlets (23a), (23b), (23c) and (23d) and withdrawn from the four triplets of post-reactor cooling jackets at water outlets (24a), (24b), (24c) and (24d). Cooling water ($CW_2$) having a temperature $T_{CC2}$ is fed to three groups of six post-reactor cooling jackets at water inlets (25a), (25b) and (25c) and withdrawn from the three groups of six of post-reactor cooling jackets at water outlets (26a), (26b) and (26c).

In some embodiments, the temperature of the melt fed to the extruder or granulator device is from 220° C. to 270° C., alternatively from 230° C. to 260° C., alternatively from 240° C. to 250° C. In some embodiments, the resulting ethylene polymers are low density polyethylenes having a melt flow rate MFR determined according to DIN EN ISO 1133:2005, condition D at a temperature of 190° C. under a load of 2.16 kg of from 0.05 g/10 min to 500 g/10 min, alternatively from 0.1 g/10 min to 300 g/10 min, alternatively from 0.15 g/10 min to 100 g/10 min.

Figure 3:
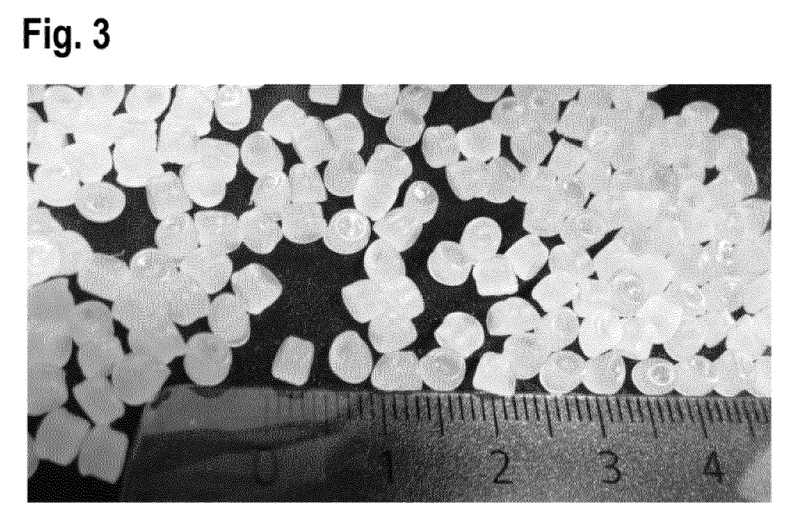
FIG. 3 shows a collection of cut pellets.
Figure 4:
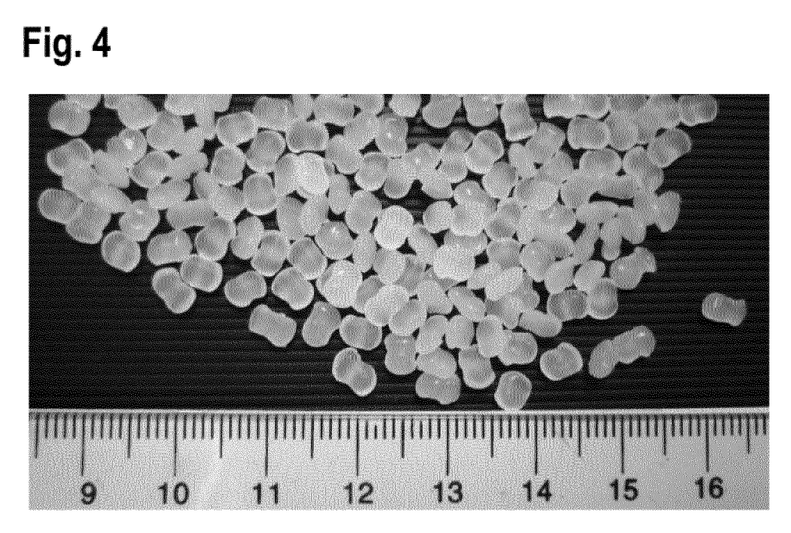
FIG. 4 shows a collection of pellets having an irregular cut compared to pellets of FIG. 3.

In some embodiments, the temperature of the melt fed to the extruder or granulator device affects the cut of the resulting pellets. In some embodiments, the resulting pellets are regularly-shaped pellets; that is, the pellets are cylindrical and not sheared to the side, and the cylinders have equal lengths with a very small diameter increase at the cylinder ends. FIG. 3 shows a representative collection of regularly-shaped pellets. The temperature of a melt fed to the extruder or granulator device can be high enough to deteriorate pellet cutting. In some of those instances, the pellets have a cylindrical shape and are sheared to the side. In some other instances, the pellets have cylinders of unequal lengths or a pronounced diameter increase at the cylinder ends. In some instances, the pronounced-diameter-increase leads to a "dog-bone" shape. FIG. 4 shows a representative collection of pellets having an irregular cut compared to the pellets of FIG. 3. In some instances, the high temperature results in pellet agglomerates. In some instances, the high temperature causes shape irregularities, which break off and yield product fines in the pellet system.

In some embodiments, independently controlling the inlet temperature of the coolant fed to the post-reactor cooling jackets from the inlet temperature of the coolant fed to the reactor cooling jackets permits adjustment of the melt temperature at the extruder inlet independently from the conditions within the polymerization reactor. In some embodiments, independently controlling the inlet temperature of the coolant fed to the post-reactor cooling jackets from the inlet temperature of the coolant fed to the reactor cooling jackets permits compensation for the different cooling behaviors of LDPE grades of different MFR values. It is believed that the temperature difference between the temperature of the reaction mixture and the coolant temperature in the production of LDPE grades having a relatively high MFR value is greater than in the production of LDPE grades having a relatively low MFR value. It is also believed that in some instances, the opposite behavior is observed for the cooling in the post reactor cooler where a two-phase system is present. In some instances and due to a lower heat transfer rate, more intense cooling in the post reactor cooler of LDPE grades, having a higher MFR value, is used to achieve the same temperature reduction as for LDPE grades, having a lower MFR.

In some embodiments, the heat removed from the polymerization system by the reactor-cooling jackets attached to the tubular polymerization reactor and the post-reactor cooling jackets attached to the post reactor cooler is used to generate steam. In some embodiments, the steam is generated from the coolant by boiling. In some embodiments, the coolant for cooling the cooling jackets is circulated in a closed loop as a secondary system circle and the removed heat of polymerization is transferred via heat exchangers to a primary coolant from which the steam is generated.

In some embodiments and for achieving a high monomer conversion rate and generating a high amount of steam, the coolant inlet temperatures of the coolants cooling the reactor-cooling jackets of the tubular polymerization reactor and the post-reactor cooling jackets of the post reactor cooler are in the range from 50° C. to 220° C., alternatively from 80° C. to 200° C., alternatively from 100° C. to 190° C.

In some embodiments, the coolant inlet temperature of the coolant of the post-reactor cooling jackets, of which the inlet temperature is independently controlled from the inlet temperature of the coolant or the coolants fed to the one or more cooling jackets cooling the polymerization reactor is in the range from 80° C. to 220° C., alternatively in the range from 100° C. to 200°.

In some embodiments, the coolants for cooling the reactor-cooling jackets of the polymerization reactor and cooling the post-reactor cooling jackets of the post reactor cooler are operated in closed loops. In some embodiments, the coolants for cooling the reactor cooling jackets of the tubular polymerization reactor and for cooling the post-reactor cooling jackets of the post reactor cooler are circulated in a cooling system having a volume buffer system for accommodating volume expansion of the coolant, a coolant circulation pump, and a cooling arrangement for removing the absorbed heat of polymerization from the cooling system.

In some embodiments, the coolants for cooling the reactor cooling jackets of the tubular polymerization reactor and for cooling the post-reactor cooling jackets of the post reactor cooler are pressurized water streams. In some embodiments, each pressurized water stream is circulated in a cooling system having a volume buffer system for accommodating volume expansion of the water, a water circulation pump, and a cooling arrangement for removing absorbed the heat of polymerization from the cooling system.

In some embodiments, the cooling of the pressurized water streams is achieved by generating steam directly from the pressurized water streams, alternatively by releasing steam from a buffer vessel of the cooling system. In some embodiments, the temperature control of the pressurized water is then carried out by varying the pressure in the buffer vessel.

In some embodiments, the reactor cooling jackets of the tubular polymerization reactor and the post-reactor cooling jackets of the post-reactor cooler are cooled by pressurized water streams are operated in closed loops as secondary system circles, and the absorbed heat of polymerization is transferred via heat exchangers to primary coolants from which steam is generated. In some embodiments, the coolants cooling the reactor cooling jackets of the tubular polymerization reactor and the post-reactor cooling jackets of the post-reactor cooler and the primary coolants are pressurized water streams. In some embodiments, the secondary cooling systems for cooling the cooling jackets are operated nitrogen pressurized to suppress boiling in the cooling systems for cooling the cooling jackets.

In some embodiments, the coolants for cooling the reactor cooling jackets of the tubular polymerization reactor and for cooling the post-reactor cooling jackets of the post reactor cooler are pressurized water streams, and the pressurized water streams for cooling the reactor cooling jackets of the tubular polymerization reactor are circulated in cooling systems having a buffer vessel and a water circulation pump and the inlet temperatures of the pressurized water streams cooling the reactor cooling jackets of the tubular polymerization reactor are controlled by varying the pressures in the buffer vessels.

In some embodiments, the coolants for cooling the reactor cooling jackets of the tubular polymerization reactor and for cooling the post-reactor cooling jackets of the post reactor cooler are pressurized water streams, and the pressurized water stream fed to the post-reactor cooling jackets of the post-reactor cooler, of which the inlet temperature is independently controlled from the inlet temperature of the pressurized water stream or the pressurized water streams fed to the one or more cooling reactor jackets cooling the polymerization reactor, is circulated in a cooling system which is cooled by a primary cooling system.

In some embodiments, the inlet temperature of at least one coolant fed to the one or more reactor cooling jackets cooling the polymerization reactor is controlled in a manner to achieve a maximum ethylene conversion. With a constant feed rate of compressed reaction gas composition from the secondary compressor to the tubular reactor, a higher ethylene conversion corresponds to a higher amount of produced ethylene polymer and, consequently, to a higher feed rate of fresh ethylene. Thus, in practice, monitoring the ethylene conversion occurs by monitoring the fresh ethylene feed rate. In some embodiments and for maximizing the ethylene conversion in the production of a specific LDPE grade, the inlet temperature of at least one coolant fed to the one or more cooling reactor jackets cooling the polymerization reactor is accordingly varied in a controlled manner until the fresh ethylene feed rate has reached a maximum.

In some embodiments, the inlet temperature of the coolant of the post-reactor cooling jackets cooling the post-reactor cooler, of which the inlet temperature is independently controlled from the inlet temperature of the coolant or the coolants fed to the one or more reactor cooling jackets cooling the polymerization reactor, is controlled by providing the temperature of the melt fed to the extruder or granulator device as set point.

In some embodiments and for maintaining water quality in the pressurized water systems, water is discontinuously released to sewer. In some embodiments, make-up water comes from the condensate system within the LDPE plant. In some embodiments, water treatment chemicals are added to maintain water quality. In some embodiments, addition occurs by a dosing pump.

In some embodiments and during plant shut-down and start-up, the coolant water system is heated by injection of steam.

In some embodiments, the coolants are monitored by a hydrocarbon detector to detect hydrocarbons leaking from the polymerization reactor or the post reactor cooler into the coolant systems.

EXAMPLES

The melt flow rate MFR was determined according to DIN EN ISO 1133:2005, condition D at a temperature of 190° C. under a load of 2.16 kg.

Density was determined according to DIN EN ISO 1183-1:2004, Method A (Immersion) with compression molded plaques of 2 mm thickness. The compression-molded plaques were prepared with a defined thermal history: Pressed at 180° C., 20 MPa for 8 min with subsequent crystallization in boiling water for 30 min.

For preparing various LDPE grades, continuous polymerizations of ethylene were carried out in a high-pressure tubular reactor of the design shown in FIG. 1 having in total a length of 2140 m with adding propionaldehyde as chain transfer agent to the fresh ethylene stream entering the primary compressor (1a). The secondary compressor (1b) was operated with a throughput of 125 t reaction gas composition per hour, compressing the reaction gas composition to a pressure of 260 MPa at the inlet of the tubular reactor. For carrying out the polymerization, peroxidic polymerization initiators were metered into the tubular reactor at four positions using isododecane as additional diluent, thereby resulting in four reaction zones within the tubular reactor.

Pressurized cooling water was circulated through reactor cooling jackets attached to the outer surface of the reactor tubes (not shown in FIG. 1) for removing the generated heat of polymerization. The reactor cooling jackets of each reaction zone were divided in two groups. The reactor cooling jackets installed at first segments of the four reaction zones, wherein the polymerization of ethylene occurred, were provided with cooling water having a first reactor cooling water temperature $T_{CR1}$ coming from a first cooling water system and the reactor cooling jackets installed at the subsequent second segments of the four reaction zones, wherein the reaction mixture obtained in the first segments was limited to cooling, were provided with cooling water having a second reactor cooling water temperature $T_{CR2}$ coming from a second, independently controlled cooling water system.

The reaction mixture was discharged from the tubular reactor (4) through pressure control valve (6). The pressure downstream of the pressure control valve (6) was reduced to about 100 MPa, resulting in a temperature increase in the reaction mixture of up to 60° C. and the formation of a two-phase system of gas and molten polymer. The reaction mixture was then passed through post-reactor cooler (7), having post-reactor cooling jackets attached to the outer surface of the tubes of the post reactor cooler. The post-reactor cooling jackets of post-reactor cooler (7) were divided in two groups. The post-reactor cooling jackets of the upstream group of post-reactor cooling jackets, that is, the post-reactor cooling jackets installed close to the inlet of the post-reactor cooler (7), were provided with cooling water coming from the first cooling water system, thereby with cooling water having the first reactor cooling water temperature $T_{CR1}$. Consequently, the first post-reactor cooler cooling water temperature $T_{CC1}$ is identical with the first reactor cooling water temperature $T_{CR1}$. The post-reactor cooling jackets of the downstream group of post-reactor cooling jackets, that is, the post-reactor cooling jackets installed close to the outlet of the post-reactor cooler (7), were provided with cooling water having a second cooler cooling water temperature $T_{CC2}$ coming from a third, independently controlled cooling water system.

The reaction mixture leaving post-reactor cooler (7) was separated from volatiles in two steps via a first separation vessel (8) and a second separation vessel (9). The gaseous components separated from the liquid fraction in the first separation vessel (8) were recycled to the secondary compressor (2) in a high-pressure circuit (11), and the gaseous components separated from the liquid fraction in the second separation vessel (9) were recycled to the primary compressor (1) in a low-pressure circuit (14). The degassed liquid polymer withdrawn from the second separation vessel (9) was conveyed to an extruder and granulator (10) to form LDPE pellets.

The granulator was an underwater pelletizer and conveyed the formed LPPE pellets to a centrifugal pellet dryer. Fines obtained during the pelletizing process remained in the pellet transport water and were separated from the pellet transport water by a sieving unit. Pellet agglomerates and oversized pellets were removed from the regular-sized LDPE pellets by sieving operations in the pellet dryer and in a subsequently located pellet classifier.

Steam having a pressure of 0.5 MPa abs was generated from both the cooling waters of the first cooling water system and of the second cooling water system. The amount of generated steam is reported in Table 1.

Example 1

A LDPE grade having a $MFR_{2.16}$ of 36 g/10 min and a density of 0.924 g/cm$^3$ was produced. The amount of added propionaldehyde was 3.4 kg per ton of produced polyethylene, and the compressed reaction gas composition was heated in pre-heater (3) to a temperature of 157° C.

The main process parameters of the ethylene polymerization, the amount of fines separated from the pellet transport water, the amount of the waste pellets separated off in the pellet dryer and in the pellet classifier, and the amount of generated 0.5 MPa abs steam are summarized in Table 1.

The pelletizer yielded regularly-shaped pellets, which were cylindrical and had a very small diameter increase at the cylinder ends.

Comparative Example A

The polymerization of Example 1 for producing a LDPE grade having a $MFR_{2.16}$ of 36 g/10 min and a density of 0.924 g/cm$^3$ was repeated with adding 3.4 kg propionaldehyde per ton of produced polyethylene and heating the compressed reaction gas composition in pre-heater (3) to a temperature of 157° C. The polymerization system was equipped with two independently controlled cooling water systems. The post-reactor cooling jackets of the upstream group of post-reactor cooling jackets, that is, the post-reactor cooling jackets installed close to the inlet of the post-reactor cooler (7), were provided with cooling water coming from the first cooling water system having the first reactor cooling water temperature $T_{CR1}$. The post-reactor cooling jackets of the downstream group of post-reactor cooling jackets were also provided with cooling water coming from the first cooling water system. Consequently, the first cooler cooling water temperature $T_{CC1}$ and the second cooler cooling water temperature $T_{CC2}$ were the same and identical with the first reactor cooling water temperature $T_{CR1}$.

The main process parameters of the ethylene polymerization, the amount of fines separated from the pellet transport water, the amount of the waste pellets separated off in the pellet dryer and in the pellet classifier, and the amount of generated 0.5 MPa abs steam are summarized in Table 1.

The high temperature of the product melt at the extruder inlet deteriorated pellet cutting, which thereby yielded a higher amount of pellet agglomerates and product fines.

Compared to Example 1, the higher amount of fines obtained during the pelletizing process resulted in more cleaning of the pellet water sieving unit and of the degassing silos.

Comparative Example B

The polymerization of Comparative Example A for producing a LDPE grade having a $MFR_{2.16}$ of 36 g/10 min and a density of 0.924 g/cm$^3$ was repeated in the polymerization system of Comparative Example A with adding 3.4 kg propionaldehyde per ton of produced polyethylene and heating the compressed reaction gas composition in pre-heater (3) to a temperature of 157° C.

The peak temperature of the 4$^{th}$ reaction zone was reduced to 285° C. The first cooler cooling water temperature $T_{CC1}$ was maintained at 160° C., thereby avoiding severe reactor fouling. The pelletizer yielded regularly-shaped pellets.

The reduced peak temperature of the 4$^{th}$ reaction zone reduced the output of the polymerization reactor.

Example 2

The polymerization of Example 1 was repeated. However, the conditions were amended to produce a LDPE grade having a $MFR_{2.16}$ of 0.3 g/10 min and a density of 0.923 g/cm$^3$. The amount of added propionaldehyde was set to 0.8 kg per ton of produced polyethylene, and the compressed reaction gas composition was heated in pre-heater (3) to a temperature of 165° C.

The main process parameters of the ethylene polymerization, the amount of fines separated from the pellet transport water, the amount of the waste pellets separated off in the pellet dryer and in the pellet classifier, and the amount of generated 0.5 MPa abs steam are summarized in Table 1.

The pelletizing of the LDPE grade occurred at stable conditions and yielded regularly-shaped pellets.

At the end of the production run for preparing the LDPE grade having a $MFR_{2.16}$ of 0.3 g/10 min, the reactor conditions were changed to produce a LDPE grade having a $MFR_{2.16}$ of 0.8 g/10 min and a density of 0.923 g/cm$^3$. After reaching the targeted $MFR_{2.16}$ value in the LDPE melt in front of the die plate, an acceptable gel level in the produced LDPE was achieved after one hour. It is believed that the delay resulted from a lagging discharge of previous LDPE from separation vessel (8) and separation vessel (9).

Comparative Example C

The polymerization of Example 2 for producing a LDPE grade having a $MFR_{2.16}$ of 0.3 g/10 min and a density of 0.923 g/cm$^3$ was repeated with adding 0.8 kg propionaldehyde per ton of produced polyethylene and heating the compressed reaction gas composition in pre-heater (3) to a temperature of 165° C. The polymerization system was equipped with two independently controlled cooling water systems. The post-reactor cooling jackets of the post-reactor cooler (7) were provided with cooling water coming from the first cooling water system having the first reactor cooling water temperature $T_{CR1}$.

In the pelletizing of the LDPE, the through-put of the extruder (10) fluctuated, resulting in the production of LDPE pellets having different sizes.

At the end of the production run for preparing the LDPE grade having a MFR$_{2.16}$ of 0.3 g/10 min, the reactor conditions were changed to produce a LDPE grade having a MFR$_{2.16}$ of 0.8 g/10 min and a density of 0.923 g/cm$^3$. After reaching the targeted MFR$_{2.16}$ value in the LDPE melt in front of the die plate, an acceptable gel level in the produced LDPE was achieved after three hours.

Comparative Example D

The polymerization of Comparative Example C for producing a LDPE grade having a MFR$_{2.16}$ of 0.3 g/10 min and a density of 0.923 g/cm$^3$ was repeated in the polymerization system of Comparative Example C with adding 0.8 kg propionaldehyde per ton of produced polyethylene and heating the compressed reaction gas composition in preheater (3) to a temperature of 165° C.

The first reactor cooler cooling water temperature $T_{CC1}$ for cooling the first segments of the reaction zones and cooling the post reactor cooler was increased to 190° C. The pelletizing of the LDPE grade occurred at stable conditions and yielded regularly-shaped pellets.

At the end of the production run for preparing the LDPE grade having a MFR$_{2.16}$ of 0.3 g/10 min, the reactor conditions were changed to produce a LDPE grade having a MFR$_{2.16}$ of 0.8 g/10 min and a density of 0.923 g/cm$^3$. After reaching the targeted MFR$_{2.16}$ value in the LDPE melt in front of the die plate, an acceptable gel level in the produced LDPE was achieved after one hour.

TABLE 1

|  |  | Example 1 | Comp. Ex. A | Comp. Ex. B | Example 2 | Comp. Ex. C | Comp. Ex. D |
|---|---|---|---|---|---|---|---|
| MFR$_{2.16}$ | [g/10 min] | 36 | 36 | 36 | 0.3 | 0.3 | 0.3 |
| Peak temperature in 1$^{st}$ reaction zone | [° C.] | 298 | 298 | 298 | 295 | 293 | 295 |
| Peak temperature in 2$^{nd}$ reaction zone | [° C.] | 305 | 305 | 305 | 298 | 298 | 298 |
| Peak temperature in 3$^{rd}$ reaction zone | [° C.] | 305 | 305 | 305 | 298 | 298 | 298 |
| Peak temperature in 4$^{th}$ reaction zone | [° C.] | 305 | 305 | 285 | 293 | 293 | 293 |
| First reactor cooling water temp. $T_{CR1}$ | [° C.] | 160 | 160 | 160 | 183 | 183 | 190 |
| Second reactor cooling water temp. $T_{CR2}$ | [° C.] | 145 | 145 | 145 | 170 | 170 | 175 |
| Melt temperature at reactor outlet | [° C.] | 281 | 281 | 263 | 273 | 273 | 277 |
| First cooler cooling water temp. $T_{CC1}$ | [° C.] | 160 | 160 | 160 | 183 | 183 | 190 |
| Second cooler cooling water temp. $T_{CC2}$ | [° C.] | 120 | 160 | 160 | 200 | 183 | 190 |
| Melt temperature at extruder inlet | [° C.] | 240 | 260 | 240 | 244 | 230 | 240 |
| Produced LDPE | [t/d] | 1110 | 1110 | 1037 | 900 | 900 | 860 |
| Generated steam (0.5 MPa) | [t/d] | 1387 | 1387 | 1295 | 1025 | 1025 | 980 |
| Waste Pellets | [kg/d] | 400 | 1500 | 400 | 350 | 450 | 380 |
| Separated fines | [kg/d] | 100 | 450 | 100 | 70 | 100 | 80 |

The invention claimed is:

1. A process for preparing ethylene polymers comprising the step of:

polymerizing ethylene or copolymerizing ethylene and one or more comonomers at a temperature from 180° C. to 350° C. and a pressure of from 110 MPa to 350 MPa in a continuously operated tubular polymerization reactor, thereby yielding a reaction mixture, wherein the tubular polymerization reactor has a reactor cooling jacket for removing the heat of the reaction and a pressure control valve, wherein the reaction mixture leaves the reactor through the pressure control valve, wherein the reaction mixture then passes a post-reactor cooler equipped with a post-reactor cooling jacket, wherein the reactor cooling jacket is provided with a reactor coolant having an inlet temperature and the post-reactor cooling jacket is provided with a post-reactor coolant having an inlet temperature, wherein the inlet temperature of the post-reactor coolant is independently controlled from the inlet temperature of the reactor coolant, wherein the post reactor cooler is equipped with an upstream cooling jacket and a downstream cooling jacket, wherein the upstream cooling jacket is provided with an upstream coolant, the downstream cooling jacket is provided with a downstream coolant, and the inlet temperature of the upstream coolant is independently controlled from the inlet temperature of the downstream coolant, and wherein the coolants for cooling the reactor cooling jackets of the tubular polymerization reactor and for cooling the post-reactor cooling jackets of the post-reactor cooler are circulated in a cooling system comprising a volume buffer system for accommodating volume expansion of the coolant, a coolant circulation pump, and a cooling arrangement for removing the absorbed heat of polymerization from the cooling system.

2. The process of claim 1, wherein the coolant of the post-reactor cooler, of which the inlet temperature is independently controlled from the inlet temperature of the coolant or the coolants fed to the one or more reactor cooling jackets cooling the polymerization reactor, is the coolant fed to a downstream cooling jacket.

3. The process of claim 1, wherein the tubular polymerization reactor has a reaction zone, having an upstream segment equipped with an upstream-cooling jacket and a downstream segment equipped with a downstream-cooling jacket,     wherein a polymerization of ethylene or a copolymerization of ethylene and the one or more comonomers occurs in the upstream segment,     the reaction mixture is cooled in the downstream segment, and     the inlet temperature of a coolant fed to the downstream segment is independently controlled from the inlet temperature of coolant fed to the upstream segment.

4. The process of claim 1, wherein the coolant inlet temperatures of the coolants cooling the reactor cooling jackets of the tubular polymerization reactor and the post-reactor cooling jackets of the post reactor cooler are in the range from 50° C. to 220° C.

5. The process of claim 1, wherein the coolant inlet temperature of the coolant of the post-reactor cooling jackets, of which the inlet temperature is independently controlled from the inlet temperature of the coolant or the coolants fed to the one or more cooling jackets cooling the polymerization reactor, is in the range from 80° C. to 220° C.

6. The process of claim 1, wherein the inlet temperature of at least one coolant fed to the one or more reactor cooling jackets cooling the polymerization reactor is controlled in a manner to achieve a maximum ethylene conversion.

7. The process of claim 1, wherein the inlet temperature of the coolant of the post-reactor cooling jackets, of which the inlet temperature is independently controlled from the inlet temperature of the coolant or the coolants fed to the one or more reactor cooling jackets cooling the polymerization reactor, is controlled by providing the temperature of the melt fed to the extruder or granulator device as set point.

8. The process of claim 1, wherein the coolants for cooling the reactor cooling jackets of the polymerization reactor and cooling the post-reactor cooling jackets of the post reactor cooler are operated in closed loops.

9. The process of claim 1, wherein the coolants for cooling the reactor cooling jackets of the polymerization reactor and cooling the post-reactor cooling jackets of the post-reactor cooler are pressurized water streams.

10. The process of claim 9, wherein the pressurized water streams for cooling the reactor cooling jackets of the tubular polymerization reactor are circulated in cooling systems comprising a buffer vessel and a water circulation pump, and the inlet temperatures of the pressurized water streams are controlled by varying the pressures in the buffer vessels.

11. The process of claim 9, wherein the pressurized water streams are circulated in a secondary cooling system which is cooled by a primary cooling system.

12. The process of claim 1, wherein the temperature of the melt fed to the extruder or granulator device is from 220° C. to 270° C.

13. The process of claim 1, wherein the ethylene polymers are low density polyethylenes, having a melt flow rate MFR determined according to DIN EN ISO 1133:2005, condition D at a temperature of 190° C. under a load of 2.16 kg of from 0.05 g/10 min to 500 g/10 min.

\* \* \* \* \*